METHOD OF MANUFACTURING A SEMICONDUCTOR CONTAINER

Filed Oct. 5, 1967

INVENTORS
TOSHIO HAMADA
KOZABURO SATO
BY
Hopgood & Calimafde
ATTORNEYS

United States Patent Office 3,524,249
Patented Aug. 18, 1970

3,524,249
METHOD OF MANUFACTURING A SEMICONDUCTOR CONTAINER

Toshio Hamada and Kozaburo Sato, Tokyo, Japan, assignors to Nippon Electric Company Limited, Tokyo, Japan Filed Oct. 5, 1967, Ser. No. 673,114
Claims priority, application Japan, Oct. 8, 1966, 41/66,275
Int. Cl. H01l 1/10
U.S. Cl. 29—588 10 Claims

ABSTRACT OF THE DISCLOSURE

A method for making a semiconductor device container by providing a metal plate with at least one slot, an insulating frame with at least one slot and a lead wire aggregate member, assembling said plate on said frame with the slots in registration with each other, passing lead wires of said lead wire aggregate member through said slots, and sealing said lead wires to said metal frame with a suitable insulating material.

BACKGROUND OF THE INVENTION

Generally, a semiconductor container includes a plurality of lead wires which pass through the wall of the container from the inside thereof to the outside. Semiconductor containers made up by sealing metal and glass together, particularly those utilizing a glass having a high sealing temperature, were usually manufactured by incorporating separate lead wires into separate holes which are preliminarily formed in a glass tablet and then sealing metal and glass together by a well known process.

In cases where lead wires arranged inside a container must be electrically insulated from one another after sealing and particularly where the shape and position of the lead wires are to be determined in such a way that they are concentrated in the center of the container, and also where a large number of lead wires are required as in an integrated circuit and the shape and position of the lead wires are to be determined in such a way that they are brought close to the vicinity of the part to which integrated circuit elements are attached, such a method has been adopted that separate lead wires are individually formed into a desired shape before sealing and then the shape and position of the lead wires are determined by a sealing jig or the like or individual lead wires are formed into a desired shape and position after sealing.

However, in the method among the conventional methods described above wherein lead wires are formed before sealing and fixed in a desired shape and position by means of a sealing jig or the like, it has been very difficult to position the lead wires in a desired shape and to prevent the lead wires from coming in contact with one another under the influence of the accuracy of a jig and of the shape and accuracy of lead wires to be formed, resulting in a lowering of the yield in the production of containers. This, of course results in high manufacturing cost. On the other hand, in the method wherein individual lead wires are formed into a desired shape and position after sealing, the bending of lead wires protruding from the surface of the glass has been unavoidable. Such bending has caused the glass to be cracked, resulting in poor airtightness, and it has been very difficult to concentrate a large number of lead wires in the center of a container and to manufacture a container that has satisfactory accuracy of the shape and position of lead wires and satisfactory airtightness. It has been still more difficult to manufacture a container in which a large number of lead wires are required as in an integrated circuit and these lead wires need to extend to the vicinity of integrated circuit elements.

OBJECTS OF THE INVENTION

It is an object of this invention to provide a method of manufacturing with ease a highly airtight and highly reliable semiconductor container having a large number of lead wires.

The above mentioned and other features and objects of this invention and the manner of attaining them will become more apparent and the invention itself will best be understood by reference to the following description of the invention taken in conjunction with the accompanying drawings.

SUMMARY OF THE INVENTION

Figures 1, 2, 3, 4, 5:
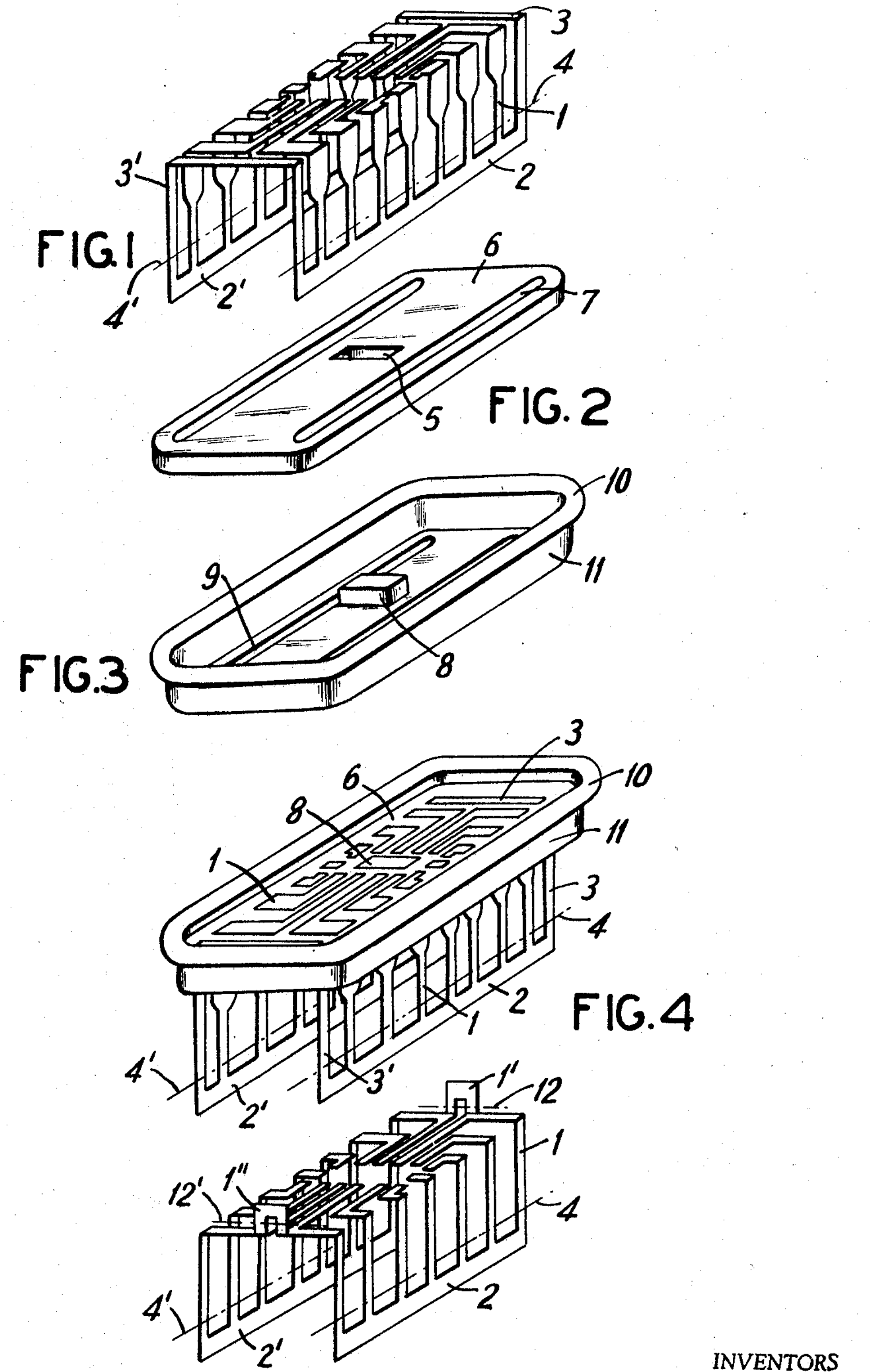
FIGS. 1, 2 and 3 are perspective views of examples of a lead wire connector, a glass tablet and a metal frame, respectively, to be used for manufacturing a semiconductor container in accordance with this invention.
FIG. 4 is a perspective view of a semiconductor container manufactured by assembling the component parts of FIGS. 1 through 3 in accordance with this invention.
FIG. 5 is a perspective view of another example of a lead wire connector useful for manufacturing a semiconductor container in accordance with this invention.

The process of manufacturing a semiconductor container in accordance with this invention is featured by comprising the steps of forming at least one slot at the bottom of a dish-shaped metal frame, placing an insulating plate provided with at least one slot on the bottom of said metal frame in such a manner that the slot thereof is in coincidence with said slot of said metal frame, causing a lead wire aggregate member, which includes a plurality of lead wires and at least one linking member for interlinking these lead wires to one another at one end of each lead wire and which is bent at an intermediate point of each lead wire, to pass through the slot of said insulating plate and the slot of said metal frame in this order on a side thereof that includes said linking member, and sealing at least said lead wires which pass through said slots and the bottom of said metal frame together.

DESCRIPTION OF PREFERRED EMBODIMENT

FIG. 1 shows a lead wire aggregate member formed of an electrically conductive material, for instance, an iron-nickel-cobalt alloy known by the trade name "Kovar." One end of each of lead wires 1 is concentrated in the center of the lead wire aggregate member and the other ends of the lead wires 1 are linked together by lead wire linking members 2 and 2', which linking members are in turn connected to each other by connecting members 3 and 3'. Such a lead wire aggregate member is manufactured either by punching or photoetching a metal sheet or by forming in advance each of lead wires 1 shown in this figure separately and attaching the connecting members 2, 2' and 3, 3' to the separate lead wires by welding or other processes by use of a suitable jig according to the shape of the lead wires. These lead wires may be bent as shown in FIG. 1, either before or after being assembled as an aggregate member.

FIG. 2 shows a tablet 6 made of glass or other insulating material, for instance, Kovar glass (No. 7052 glass of Corning Glass Works), having slots 7 through which the lead wire aggregate member is to be inserted and a rectangular hole 5 in which a mount for a semiconductor element is to be inserted.

FIG. 3 shows a metal frame 11 made of Kovar or other metal and having a semiconductor element mount 8 which is made of a metal of good conductivity and fixed to the bottom of the frame 11 by welding, soldering or other suitable method. A pair of slots 9 through which the lead wire aggregate member is to be inserted are formed opposite to each other on the bottom of the frame 11.

After the lead wire aggregate member, the glass tablet and the metal frame have been formed as shown in FIGS. 1 through 3, they are assembled together. In more detail, the glass tablet 6 is put in the metal frame 11, and those parts of the lead wire aggregate member which have been bent are made to pass through both the slots 7 of the glass tablet and the slots 9 of the metal frame. Then, the metal frame and the lead wires are sealed together with sealing glass or the like at least at the slots 9 of the metal frame 11. It is preferable to seal the tablet and the lead wires together at the slots 7 of the glass tablet, to seal the side and bottom faces of the glass tablet 6 and the inside face of the metal frame 11 together, and to bond the upper surface of the glass tablet and the lead wires together at the same time. In this way, a semiconductor container as shown in FIG. 4 is manufactured. A semiconductor container having lead wires each of which is electrically insulated is provided by cutting off the lower parts of the lead wire aggregate member along dotted lines 4 and 4′, thus making it possible to manufacture with ease containers in which a large number of lead wires are required and with such accuracy as to satisfy specifically the complicated shape and position of lead wires called for. A semiconductor element such as a semiconductor integrated circuit element is bonded to the element mount 8 and each electrode of the element is connected with each lead wire 1 by use of a fine conductive wire, and thereafter a suitable cap is put on the metal frame, followed by performing a hermetic seal at the periphery of the metal frame to complete the semiconductor device.

In FIG. 4, the lead wire connecting members 3 and 3′ are not necessary with the circuit arrangement in the inside of the container for an ordinary semiconductor element, after the lower parts of lead wires have been cut off along the dotted lines. But when a semiconductor device using this container is incorporated in an electrical apparatus, these lead connecting members have the advantage of being used as connecting terminals in wiring the apparatus. If the lead connecting members 3 and 3′ are not required according to the purpose for which the semiconductor device is used, it is appropriate to use a lead wire aggregate member as shown in FIG. 5. In FIG. 5, a lead wire aggregate member consists of several pairs of lead wires which are placed opposite to each other and obtained by connecting lead wires 1 made of conductive material, for instance, Kovar, to each other by use of lead wire connecting members 2, 2′ and 1′, 1″. The lead wire aggregate member of FIG. 5 is manufactured by the same process as in FIG. 1. After the above-mentioned glass tablet 6 is placed in the metal frame 11, the lead wire aggregate member of FIG. 4 is caused to pass through both the slots 7 of the glass tablet and the slots 9 of the metal frame and then metal and glass are sealed together by any well-known process. Thereafter, the lower parts and the upper parts of the lead wire aggregate member are cut off and removed along dotted lines 4, 4′ and 12, 12′, respectively, to complete a semiconductor container having lead wires each of which is electrically insulated.

As mentioned above, it is now possible according to this invention, to arrange lead wires with ease so that they may be concentrated in the center of a container and particularly in the vicinity of a mount for an integrated circuit element, and also to obtain with ease an inexpensive and reliable container for a semiconductor element, particularly for an integrated circuit element in which a large number of lead wires are required. While the above embodiment of this invention adopts the construction in which the element is mounted directly on the metal mount 8 so as to facilitate the conduction of heat generated from the element, this invention may be applied to the construction in which an element is mounted either on one of the lead wires 1 or on the glass tablet 6 or in which an element is face-bonded to the lead wires 1 through the known process. The material, shape and number of each part of the container will of course, be modified for the particular application.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A method of manufacturing a semiconductor container comprising the steps of forming at least one slot at the bottom of a dish-shaped metal frame, placing an insulating plate provided with at least one slot on the bottom of said metal frame in such a manner that the slot thereof is in coincidence with said slot of said metal frame, causing a lead wire aggregate member, which includes a plurality of lead wires and at least one linking member for interlinking these lead wires to one another at one end of each lead wire to pass through the slot of said insulating plate and the slot of said metal frame in that order, and sealing at least said lead wires which pass through said slots and the bottom of said metal frame together.

2. The method of claim 1 including the step of bending said lead wires at an intermediate point so that the aggregate member has a side which includes the linking member which interlinks the lead wires at one end, and passing said side through said slots such that the last-named connecting member is entirely exposed below the surface of the frame.

3. The method of claim 2 including the step of cutting away the connected member which interlinks the lead wires at one end after the step of sealing.

4. The method of claim 1 wherein the sealing step includes sealing the insulating plate to the lead wires.

5. The method of claim 4 wherein the sealing step further includes sealing the side and bottom faces of the insulating plate to the inside face of the metal frame into which the insulating plate was placed.

6. The method of claim 5 wherein the sealing step includes bonding the upper surface of the insulating plate and the lead wires together.

7. The method of claim 5 including the step of bending said lead wires at an intermediate point so that the aggregate member has a side which includes the linking member which interlinks the lead wires at one end, and passing said side through said slots such that the last-named connecting member is entirely exposed below the surface of the frame.

8. The method of claim 6 including the step of bending said lead wires at an intermediate point so that the aggregate member has a side which includes the linking member which interlinks the lead wires at one end, and passing said side through said slots such that the last-named connecting member is entirely exposed below the surface of the frame.

9. The method of claim 7 including the step of cutting away the connecting member which interlinks the lead wires at one end after the step of sealing.

10. The method of claim 8 including the step of cutting away the connecting member which interlinks the lead wires at one end after the step of sealing.

References Cited

UNITED STATES PATENTS

| | | | |
|---|---|---|---|
| 2,985,806 | 5/1961 | McMahon et al. | |
| 3,092,893 | 6/1963 | Cornelison et al. | |
| 3,270,399 | 9/1966 | Ohntrup | 29—589 |
| 3,271,625 | 9/1966 | Caracciolo | 29—589 |
| 3,281,628 | 10/1966 | Bauer et al. | 29—588 |

PAUL M. COHEN, Primary Examiner

R. B. LAZARUS, Assistant Examiner

U.S. Cl. X.R.

29—577, 589